United States Patent
Cianciotto

(10) Patent No.: US 7,428,356 B1
(45) Date of Patent: Sep. 23, 2008

(54) HOMOGENIZING POLYGONAL SHAPE INVERTED "Y" OPTICAL BEAM SPLITTER

(75) Inventor: Frank T. P. Cianciotto, Tehachapi, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/763,139

(22) Filed: Jun. 14, 2007

(51) Int. Cl.
*G02B 6/26* (2006.01)
(52) U.S. Cl. .......................... 385/45; 385/146; 362/551
(58) Field of Classification Search ................... 385/39, 385/45, 133, 146; 362/551
See application file for complete search history.

(56) References Cited

U.S. PATENT DOCUMENTS 7,113,684 B1 * 9/2006 Cianciotto et al. .......... 385/133

2005/0135766 A1 6/2005 Cianciotto et al.

* cited by examiner

*Primary Examiner*—Frank G Font
*Assistant Examiner*—Michael P Mooney
(74) *Attorney, Agent, or Firm*—Duke W. Yee; Charles S. Gumpel; Gerald H. Glanzman

(57) ABSTRACT

A polygonal shape inverted "Y" optical beam splitter for splitting input light into two, equal intensity, homogenous light beams. A one-piece hollow tubular body is provided having a first, second, and third leg. Each leg has a polygonal cross-section and a highly reflective interior surface. The first leg is configured to receive an input light beam having an intensity and spectral content that is reflected within the first leg to provide a first leg output light beam. The first leg output light beam is split and reflected into a second and third leg to provide, after reflection in the second leg and the third leg, a second leg and third leg output light beam. Each of the second leg and third leg output light beam has a homogeneous top hat profile and an intensity equal to one half of the intensity of the input light beam.

22 Claims, 3 Drawing Sheets

HOMOGENIZING POLYGONAL SHAPE INVERTED "Y" OPTICAL BEAM SPLITTER

BACKGROUND INFORMATION

1. Field

The present disclosure relates generally to the fields of optical communication and optical signal processing, and in particular to a polygonal shape inverted "Y" optical beam splitter for splitting input light received into two new, but equal intensity, homogenous light beams.

2. Background

In optical communication systems, a waveguide is a physical structure which guides electromagnetic waves in the optical spectrum along a path defined by the physical construction of the guide. Common types of optical waveguides include optical fiber and planar waveguides. One optical device which employs optical waveguides is an optical beam splitter. Beam splitters may be found in a wide variety of common optical instruments, such as cameras, binoculars, microscopes, telescopes, periscopes, range finders, and surveying equipment, as well as in many scientific instruments, including interferometers, spectrophotometers, and fluorimeters. A beam splitter is an optical component that splits a beam of light into two coherent parts. With the metal films, mirrors, and/or prisms, the beam splitter partially transmits and partially reflects the incident light beam, usually in unequal proportions. The beam splitter is placed in the path of a propagating light beam at an incidence angle relative to the beam. When positioned at such an incidence angle, the beam splitter divides the incident light beam into reflected and transmitted output beams at each point on a plane in the incident beam's wavefront.

Typical optical elements of a beam splitter which allow for splitting or combining the light beam may include metal films, mirrors, and/or prisms. When using conventional beam splitters, an initial critical alignment of the optical elements in the beam splitter is required in order to achieve the desired output beams. This initial critical configuration must then be maintained, as these elements are susceptible to misalignment and possible optical contamination. Furthermore, the use of multiple optical elements in a beam splitter can lead to substantial intensity losses and beam quality degradation.

SUMMARY

Advantageous embodiments of the present disclosure provide a polygonal shape inverted "Y" optical beam splitter for splitting input light received into two new, but equal intensity, homogenous light beams. In one illustrative embodiment, a one-piece hollow tubular body is provided which has a first leg, a second leg, and a third leg. Each leg has a polygonal cross-section and a highly reflective interior surface. The first leg is configured to receive an input light beam having an intensity and spectral content that is reflected within the first leg to provide a first leg output light beam. The first leg output light beam is split and reflected into a second leg and a third leg to provide, after reflection in the second leg and the third leg, a second leg output light beam and third leg output light beam. Each of the second leg output light beam and the third leg output light beam has a homogeneous top hat profile and an intensity equal to one half of the intensity of the input light beam.

In another illustrative embodiment, a method of homogenizing light beams is provided. The method comprises receiving a first light beam in a first leg of a one-piece hollow tubular body. The first light beam has an intensity and spectral content. The one-piece hollow tubular body comprises the first leg, a second leg, and a third leg. Each leg has a polygonal cross-section and a highly reflective interior surface. The first light beam is reflected within the first leg to produce a first homogenized light beam. The first homogenized light beam is split into a second homogenized light beam and a third homogenized light beam. The second homogenized light beam is received in the second leg of the one-piece hollow tubular body. The second homogenized light beam is reflected within the second leg to produce a second leg output light beam. The second leg output light beam has a homogeneous top hat profile and an intensity equal to one half of the intensity of the first light beam. A third homogenized light beam is received in the third leg of the body. The third homogenized light beam is reflected within the third leg to produce a third leg output light beam. The third leg output light beam has a homogeneous top hat profile and an intensity equal to one half of the intensity of the first light beam.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the present disclosure are set forth in the appended claims. The present disclosure itself, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
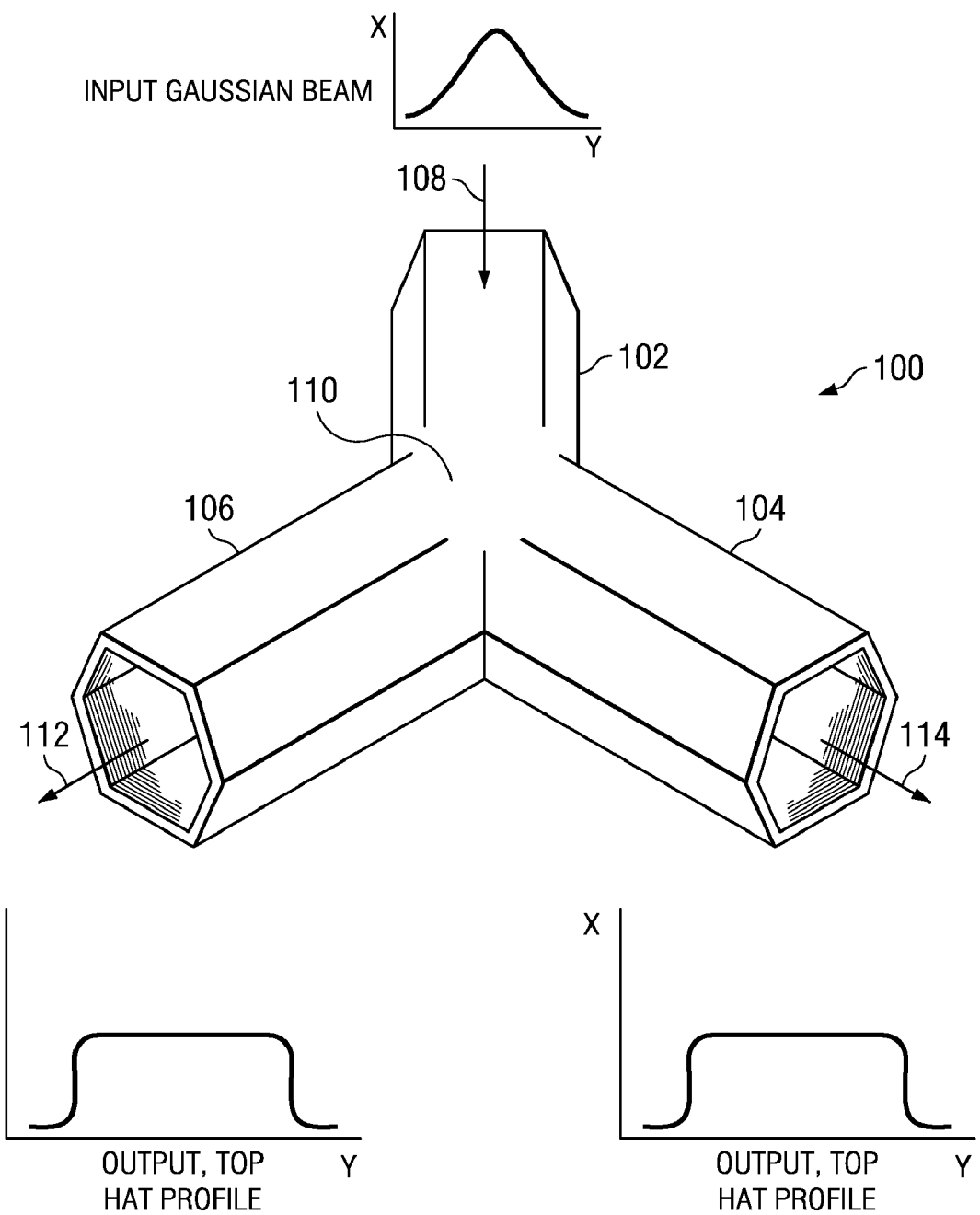
FIG. 1 is an illustration of a polygonal shape inverted "Y" optical beam splitter in which an advantageous embodiment of the present disclosure may be implemented.

With reference now to the figures, and, in particular, with reference to FIG. 1, an illustration of a polygonal shape inverted "Y" optical beam splitter assembly is depicted which combines two optical processes into one device and in which an advantageous embodiment of the present disclosure may be implemented. In particular, Y-branch beam splitter assembly 100 comprises a single device which may operate as a light beam splitter and a homogenizer in accordance with advantageous embodiments of the disclosure.

Y-branch beam splitter assembly 100 splits an incoming Gaussian light source into two separate, highly homogeneous top hat profile light beams. The intensity of each of the final exit beams is ½ of the intensity of the original Gaussian input beam. Y-branch beam splitter assembly 100 comprises a one-piece hollow tubular body and is formed of input waveguide leg 102, and two output waveguide legs 104 and 106 that meet at input waveguide 102. In this illustrative example, input waveguide leg 102 and output waveguide legs 104 and 106 are shown to have hexagonal cross-sections. However, the cross-section of each leg may include any polygonal shape, including a triangle, a square, a pentagon, a heptagon, and an octagon, among others. Each leg also has a highly reflective interior surface.

Furthermore, input waveguide leg 102, output waveguide leg 104, and output waveguide leg 106 each have a central axis. In one embodiment, the central axis of at least two of input waveguide leg 102, output waveguide leg 104, and output waveguide leg 106 are co-planar. In another embodiment, the central axis of at least two of input waveguide leg 102, output waveguide leg 104, and output waveguide leg 106 are co-linear. Various angles may be used between the central axis of each leg, such as between input waveguide leg 102 and output waveguide leg 104, and between input waveguide leg 102 and output waveguide leg 106. In one embodiment, the angle between the central axis of output waveguide leg 104 and the central axis of output waveguide leg 106 is between about 15° to about 45°. The polygonal cross-section of input waveguide leg 102 and output waveguide legs 104 and 106 may all be the same shape. Alternatively, at least two of the legs may have a different cross-sectional shape from the other legs.

Input waveguide leg 102 is configured to receive input light beam 108. Input light beam 108 may comprise a single point light source (e.g., from a fiber optic cable), multiple point light sources (e.g., from a fiber optic cable bundle), or an omni directional light source. Input light beam 108 may be a Gaussian beam, which is a beam that allows the highest concentration of focused light. As Gaussian input light beam 108 travels down input waveguide leg 102 and output waveguide legs 104 and 106, Gaussian input light beam 108 undergoes numerous reflections off of the highly reflective interior surface of input waveguide leg 102 and output waveguide legs 104 and 106. These multiple reflections of Gaussian input light beam 108 within Y-branch beam splitter assembly 100 allow Gaussian input light beam 108 to be transformed into a top hat profile beam. A top hat beam is a beam that allows for very uniform distribution of energy across a given area. In other words, the intensity of a top hat profile beam is the same across the entire face of the beam.

When the Gaussian input light beam 108 reaches inverted "Y" junction 110 of Y-branch beam splitter assembly 100, Gaussian input light beam 108 is evenly split into two equal intensity output beams 112 and 114. As output beams 112 and 114 continue down each of output waveguide legs 104 and 106, each beam undergoes additional reflections off of the sides of output waveguide legs 104 and 106. These additional reflections assure that each output beam 112 and 114 is thoroughly homogenized. Each output beam 112 and 114 has an intensity which is ½ the intensity of the initial Gaussian input light beam 108.

Thus, Y-branch beam splitter assembly 100 performs two major functions which, using existing methods, require a minimum of three separate optical or glass devices to perform these tasks. Y-branch beam splitter assembly 100 is able to perform these two functions at a higher overall efficiency at a smaller size and weight than current beam splitters, without the use of optical (glass mirror) components. Elimination of all optical components means that Y-branch beam splitter assembly 100 can never go out of alignment. Consequently, Y-branch beam splitter assembly 100 is extremely rugged and may be particularly useful in areas that experience high vibration or shock loads.

The first function of Y-branch beam splitter assembly 100 is its ability to convert an initial Gaussian profile light beam into a highly uniform homogeneous top hat profile beam. This conversion is called "beam homogenization" and it is accomplished due to the polygonal shape and the highly reflective interior surfaces of input waveguide leg 102 and output waveguide legs 104 and 106. This conversion is useful when using Y-branch beam splitter assembly 100 to project output beams 112 and 114 into a bundle of fibers. The homogeneous nature of output beams 112 and 114 assures that each individual fiber within the bundle receives the same intensity of light.

The second function of Y-branch beam splitter assembly 100 is its ability to evenly split the input light source into two new, but equal intensity output sources. This split into two equal intensity output sources is accomplished at inverted "Y" junction 110 of Y-branch beam splitter assembly 100, and occurs without the use of any optics. The amplitude of each output beam 112 and 114 will be ½ the intensity of the amplitude of initial Gaussian input light beam 108.

Figure 2:
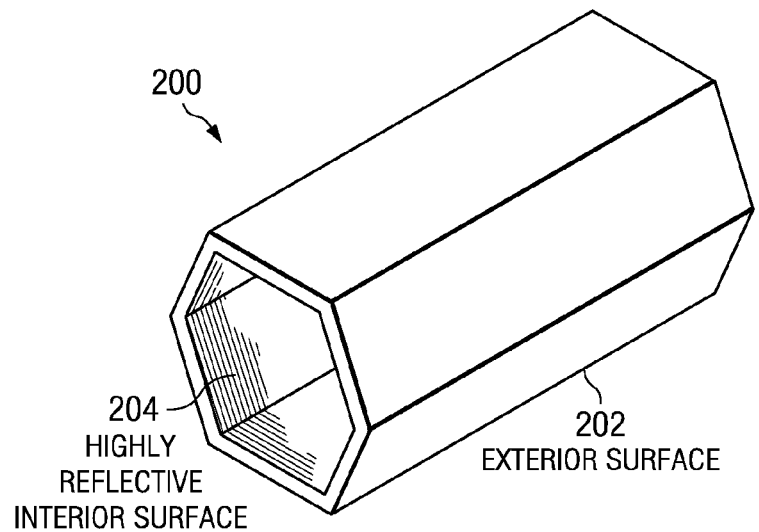
FIG. 2 is an illustration of a polygonal tube used in each leg of the polygonal shape inverted "Y" optical beam splitter in accordance with an advantageous embodiment of the present disclosure.

FIG. 2 is an illustration of a polygonal tube in accordance with an advantageous embodiment of the present disclosure. Polygonal tube 200 may be used in each leg (input waveguide leg 102 and output waveguide legs 104 and 106) of the Y-branch beam splitter assembly 100 in FIG. 1. The polygonal shape of input waveguide leg 102 and output waveguide legs 104 and 106 converts a standard Gaussian input beam into a highly uniform homogeneous top hat profile beam.

Polygonal tube 200 may be produced by electroforming. Electroforming is the process of fabrication using electrodeposition in a plating bath over a base form or mandrel which is subsequently removed. In this manner, electroforming fabricates polygonal tube 200 from the plating itself. The mandrel is an object used to shape polygonal tube 200. A polygonal shaped mandrel shapes polygonal tube 200 by first plating the exterior of the polygonal shaped mandrel with a highly reflective material, such as gold or silver, or any combination of such highly reflective materials. The highly reflective material may also comprise composite materials. The highly reflective material used to coat the mandrel may be selected based on the wavelength of the input/output light. For visible light, a silver surface may achieve the highest efficiency. The mandrel is then plated with a thick coating of nickel to provide a "stand alone" thickness. The "stand alone" thickness enables polygonal tube 200 to be a self-supporting structure when the mandrel is removed. The mandrel may be removed by chemically dissolving or exploiting differences in thermal coefficients of expansion between the electroformed part and the mandrel.

In one embodiment, an aluminum polygonal mandrel is first coated with silver, and then coated with nickel. The aluminum polygonal mandrel is chemically dissolved, leaving polygonal tube 200 comprising a nickel exterior surface 202 and a highly reflective silver interior surface 204. Highly reflective interior surface 204 forces the Gaussian input beam to fold over onto itself after each reflection in polygonal tube 200. As the beam folds over onto itself numerous times during its transition down the length of the tube, the original Gaussian input beam is shaped into a highly uniform homogeneous top hat profile beam.

Figure 3:
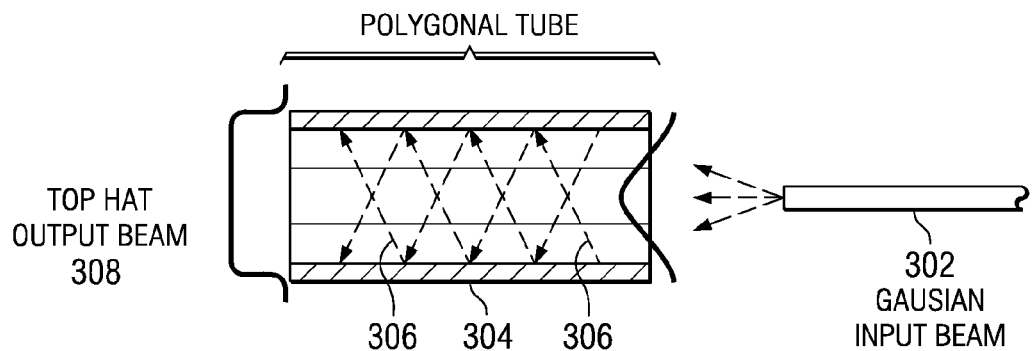
FIG. 3 is an illustration of a Gaussian input beam entering into a polygonal tube, and the top hat output beam being output from the polygonal tube in accordance with an advantageous embodiment of the present disclosure.

FIG. 3 is an illustration of a Gaussian input beam entering into polygonal tube 200 in FIG. 2, and a top hat output beam being output from the polygonal tube in accordance with an advantageous embodiment of the present disclosure. An initial Gaussian input beam 302 is generated from a fiber. When Gaussian input beam 302 enters the input of polygonal tube 304, the shape of Gaussian input beam 302 from the fiber optic cable is in a fan pattern. The fan shape output from the fiber optic cable will allow Gaussian input beam 302 to strike the interior sides of polygonal tube 304. Gaussian input beam 302 strikes and reflects against the highly reflective surface of polygonal tube 304. As Gaussian input beam 302 travels down the length of polygonal tube 304, Gaussian input beam 302 may undergo numerous reflections 306. In one embodiment, Gaussian input beam 302 is reflected a minimum of five times within Y-branch beam splitter assembly 100 in FIG. 1. In another embodiment, Gaussian input beam 302 is reflected a minimum of five times within at least one of input waveguide leg 102, output waveguide leg 104, or output waveguide leg 106 in FIG. 1. While Gaussian input beam 302 may reflected any number of times within Y-branch beam splitter assembly 100 in FIG. 1, to achieve a combination of highest efficiency and best beam uniformity, Gaussian input beam 302 should be reflected a minimum of five times within Y-branch beam splitter assembly 100. Six reflections is the theoretical best number of reflections within Y-branch beam splitter assembly 100 which will achieve a highly uniform homogenous top hat output beam.

With each strike against the interior sides of polygonal tube 304, Gaussian input beam 302 folds over onto itself, resulting in the initial Gaussian input beam 302 being transformed into a highly uniform homogenous top hat output beam 308. While various width to length ratios of polygonal tube 304 may be used to achieve highly uniform homogenous top hat output beam 308, the best overall efficiency to beam uniformity may be achieved using a width to length ratio of 1:6. This width to length ratio of polygonal tube 304 enables Gaussian input beam 302 to achieve a top hat profile that is uniform to within 99% of the optimum design.

Figure 4:
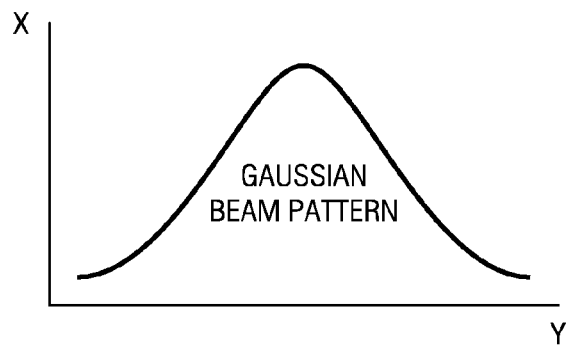
FIG. 4 is an illustration of a plot of intensity for the Gaussian beam input to the polygonal shape inverted "Y" optical beam splitter in accordance with an advantageous embodiment of the present disclosure.

FIG. 4 illustrates a plot of intensity for the Gaussian beam input to the polygonal shape inverted "Y" optical beam splitter in accordance with an advantageous embodiment of the present disclosure. Light entering input waveguide leg 102 in Y-branch beam splitter assembly 100 in FIG. 1 has a Gaussian profile with an intensity "X". As previously mentioned, a Gaussian beam is a beam that allows the highest concentration of focused light. The intensity pattern across the Gaussian beam in FIG. 4 is similar to a bell shape curve—highest at the center and falling off towards the edges.

Figure 5:
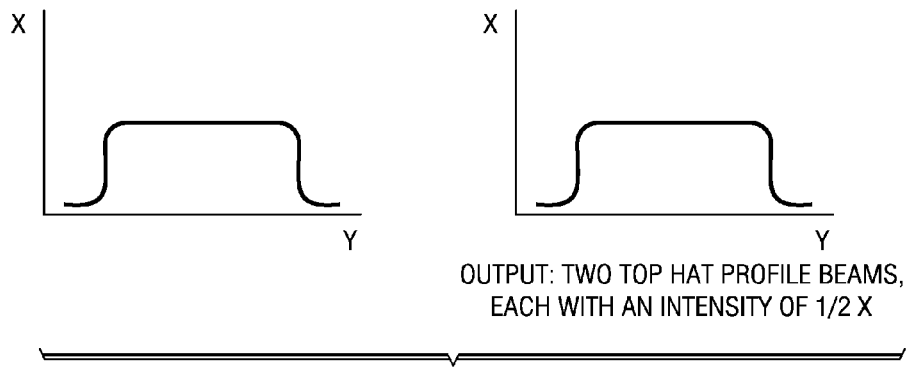
FIG. 5 is an illustration of plots of intensity of two top hat beams for the output of the polygonal shape inverted "Y" optical beam splitter in accordance with an advantageous embodiment of the present disclosure.

FIG. 5 illustrates plots of intensity of two top hat beams for the output of the polygonal shape inverted "Y" optical beam splitter in accordance with an advantageous embodiment of the present disclosure. Light entering input waveguide leg 102 in Y-branch beam splitter assembly 100 in FIG. 1 has a Gaussian profile with an intensity "X". As the light beam travels down the input and output polygonal tubes, the light beam undergoes numerous reflections off of the highly reflective sides of the tubes. These multiple reflections transform the initial Gaussian light beam into a top hat profile beam.

Furthermore, at the inverted Y junction of the Y-branch beam splitter assembly 100 in FIG. 1, input light beam 108 is evenly split into two equal intensity output beams 112 and 114. The intensity of each of the two output beams will be ½ the intensity of the original Gaussian input beam 108. As the two new beams continue down each of output waveguide legs 104 and 106 in FIG. 1, the two new beams each undergo additional reflections off of the side of the polygonal tubes. These additional reflections will assure that each of the output beams are thoroughly homogenized and transformed into top hat profile beams, as shown in FIG. 5.

Figure 6:
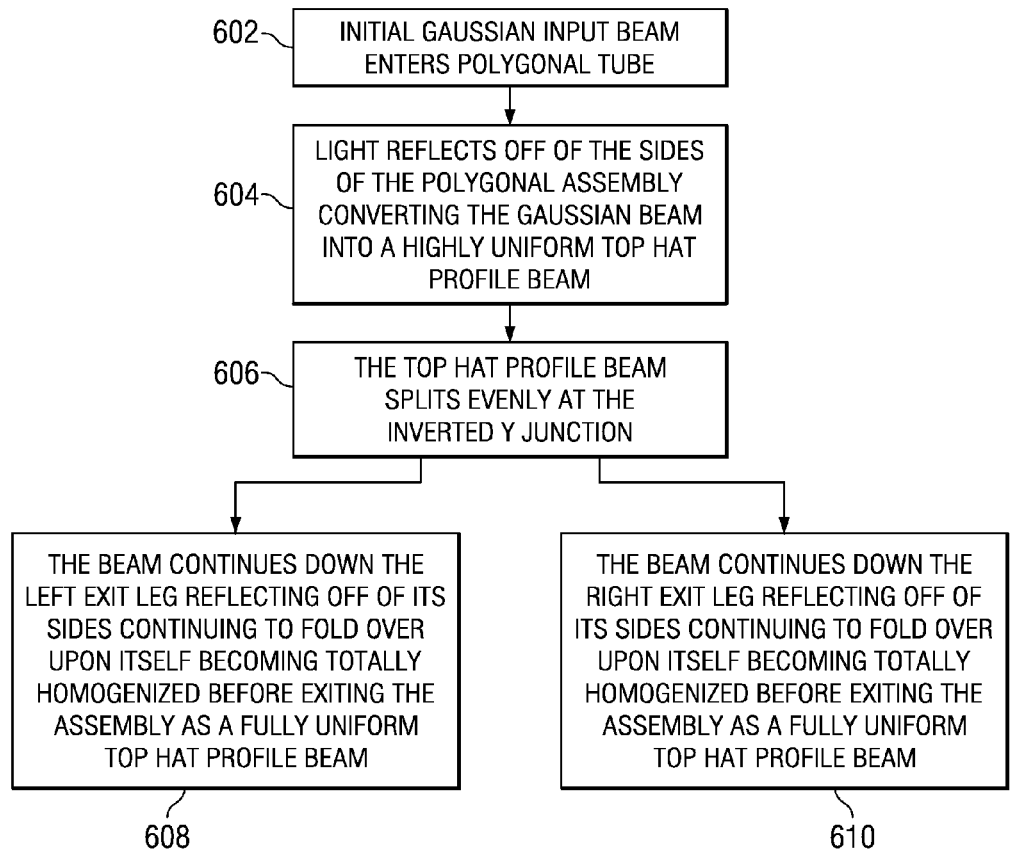
FIG. 6 is flowchart of a process for splitting input light into two equal intensity, homogenous light beams using a polygonal shape inverted "Y" optical beam splitter in accordance with an advantageous embodiment of the present disclosure.

FIG. 6 is flowchart of a process for splitting input light into two equal intensity, homogenous light beams using a polygonal shape inverted "Y" optical beam splitter in accordance with an advantageous embodiment of the present disclosure. The process begins when an initial Gaussian input beam enters the input tube of the polygonal shape "Y" beam splitter (step 602). The Gaussian input beam may comprise a single point light source, multiple point light sources, or an omni directional light source. The Gaussian input beam may also comprise a fan-pattern shape. As the Gaussian input beam reflects off of the highly reflective sides of the interior surface of the polygonal shape "Y" beam splitter assembly, the Gaussian input beam is converted into a top hat profile beam (step 604). A top hat beam provides a uniform distribution of illumination.

At the inverted "Y" junction of the polygonal shape "Y" beam splitter assembly, the light beam splits evenly (step 606). Thus, ½ of the intensity of the initial light beam travels through one of the output waveguide legs of the polygonal shape "Y" beam splitter assembly, and the other ½ of the initial light beam travels through the second output waveguide leg of the polygonal shape "Y" beam splitter assembly.

One of the top hat profile beams continues down the first output waveguide leg, reflecting off of the highly reflective sides of the output waveguide leg and continuing to fold over upon itself, thereby becoming totally homogenized before exiting the polygonal shape "Y" beam splitter assembly as a fully uniform top hat profile beam (step 608).

The second of the top hat profile beams continues down the second output waveguide leg, reflecting off of the sides of the second output waveguide leg and continuing to fold over upon itself, thereby becoming totally homogenized before exiting the polygonal shape "Y" beam splitter assembly as a fully uniform top hat profile beam (step 610).

Thus, the present disclosure provides a method and apparatus for providing a lightweight but rugged device that may operate as a light beam splitter and a homogenizer. In contrast with existing solutions which would require numerous optical components and support hardware (e.g., a minimum of three optical devices (mirrors) and mounting/alignment hardware), the polygonal shape "Y" beam splitter assembly comprises a single device which operates as a light beam splitter and a homogenizer, without the use of any optical or glass elements. The present disclosure enables an incoming Gaussian light source to be split into two new, but equal intensity homogenous light beams. In addition, the present disclosure provides the ability to transform an initial input Gaussian light beam into two separate top hat profile beams at each of the respective outputs.

The polygonal shape "Y" beam splitter assembly is able to transform an input Gaussian beam into two separate homogenous top hat profile beams at an extremely high efficiency (>95%) and with no alignment or beam splitting optics.

As the polygonal shape "Y" beam splitter assembly does not require the use of optical or glass elements, the polygonal shape "Y" beam splitter assembly does not require an initial critical alignment of optical components, nor is the polygonal shape "Y" beam splitter assembly required to contain any components that are susceptible to misalignment and possible optical contamination. In addition, since the polygonal shape "Y" beam splitter assembly does not contain optical or glass elements, the polygonal shape "Y" beam splitter assembly provides a lightweight solution which is extremely rugged and can be used in areas that experience high vibration or shock loads since no alignment is required. Furthermore, the polygonal shape "Y" beam splitter assembly will not experience the substantial intensity losses and beam quality degradation experienced with the use of multiple optical elements.

The description of the present disclosure has been presented for purposes of illustration and description, and is not intended to be exhaustive or limited to the disclosure in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the present disclosure, the practical application, and to enable others of ordinary skill in the art to understand the present disclosure for various embodiments with various modifications as are suited to the particular use contemplated.

What is claimed is:

1. An optical homogenizing and beam splitting apparatus, comprising:
    a one-piece hollow tubular body having a first leg, a second leg, and a third leg joined together to form a closed Y-shaped junction, each leg having a polygonal cross-section and a reflective interior surface, wherein the first leg is configured to receive an input light beam having a first intensity that is reflected within the first leg to provide a first leg output light beam at the closed Y-shaped junction, the first leg output light beam being split and reflected into the second leg and the third leg at the closed Y-shaped junction without use of optical components to provide, after reflection in the second leg and the third leg, a second leg output light beam and a third leg output light beam, wherein each of the second leg output light beam and the third leg output light beam has a homogeneous top hat profile and a second intensity equal to one half of the first intensity of the input light beam.

2. The apparatus of claim 1, wherein said input light beam has a Gaussian profile.

3. The apparatus of claim 1, wherein said polygonal cross-section is one of a triangle, a square, a pentagon, a hexagon, a heptagon, or an octagon.

4. The apparatus of claim 1,
    wherein the first leg has a first central axis, the second leg has a second central axis, and the third leg has a third central axis; and
    wherein the first central axis, the second central axis, and the third central axis are co-planar.

5. The apparatus of claim 4, wherein an angle between the second central axis and the third central axis is between about 15° to about 45°.

6. The apparatus of claim 1, wherein the input light beam is reflected a minimum of five times within the one-piece hollow tubular body.

7. The apparatus of claim 1, wherein the input light beam is reflected a minimum of five times within at least one of the first leg, second leg, and third leg.

8. The apparatus of claim 1, wherein the reflective interior surface of the one-piece hollow tubular body includes an interior metal plating, wherein metal in the interior metal plating is one of silver, gold, or a combination of both.

9. The apparatus of claim 1, further comprising:
    an exterior metal plating configured to provide structural rigidity for the one-piece hollow tubular body, wherein metal in the exterior metal plating includes nickel.

10. A method of homogenizing light beams, the method comprising:
    receiving a first light beam in a first leg of a one-piece hollow tubular body which comprises the first leg, a second leg, and a third leg joined together to form a closed Y-shaped junction, each leg having a polygonal cross-section and a reflective interior surface, and wherein the first light beam has a first intensity;
    reflecting the received first light beam within the first leg to produce a first homogenized light beam;
    splitting the first homogenized light beam into a second homogenized light beam and a third homogenized light beam at the closed Y-shaped junction without use of optical components;
    receiving the second homogenized light beam in the second leg of the one-piece hollow tubular body;
    reflecting the received second homogenized light beam within the second leg to produce a second leg output light beam having a homogeneous top hat profile and a second intensity equal to one half of the first intensity of the first light beam;
    receiving the third homogenized light beam in the third leg of the body; and
    reflecting the received third homogenized light beam within the third leg to produce a third leg output light beam having a homogeneous top hat profile and a third intensity equal to one half of the first intensity of the first light beam.

11. The method of claim 10, wherein the first light beam has a Gaussian profile.

12. The method of claim 10, wherein the polygonal cross-section is one of a triangle, a square, a pentagon, a hexagon, a heptagon, or an octagon.

13. The method of claim 10, wherein the polygonal cross-section of at least two of the first leg, second leg, and third leg are different from each other.

14. The method of claim 10, wherein the first leg has a first central axis, the second leg has a second central axis, and the third leg has a third central axis; and
    wherein the first central axis, the second central axis, and the third central axis are coplanar.

15. The method of claim 14, wherein the the angle between the first central axis and the second central axis is between about 15° to about 45°.

16. The method of claim 10, wherein the first light beam is reflected a minimum of five times within the one-piece hollow tubular body.

17. The method of claim 10, wherein the first light beam is reflected a minimum of five times within at least one of the first leg, second leg, and third leg.

18. The method of claim 10, wherein the first light beam is supplied by one of a fiber optic cable, a fiber optic cable bundle, or a omni directional light source.

19. An optical homogenizing and beam splitting apparatus, comprising:
    a one-piece hollow tubular body having a first leg, a second leg, and a third leg, each leg having a polygonal cross-section and a highly reflective interior surface, wherein the first leg is configured to receive an input light beam having a first intensity and spectral content that is reflected within the first leg to provide a first leg output light beam, the first leg output light beam being split and reflected into a second leg and a third leg to provide, after reflection in the second leg and the third leg a second leg output light beam and third leg output light beam, wherein each of the second leg output light beam and the third leg output light beam has a homogeneous top hat profile and a second intensity equal to one half of the first intensity of the input light beam, wherein the input light beam is reflected a minimum of five times within the one-piece hollow tubular body.

20. The optical homogenizing and beam splitting apparatus of claim 19, wherein the input light beam is reflected a minimum of five times within at least one of the first leg, the second leg and the third leg.

21. A method of homogenizing light beams, the method comprising:
  receiving a first light beam in a first leg of a one-piece hollow tubular body which comprises the first leg, a second leg, and a third leg, each leg having a polygonal cross-section and a highly reflective interior surface, and wherein the first light beam has a first intensity and spectral content;
  reflecting the received first light beam within the first leg to produce a first homogenized light beam;
  splitting the first homogenized light beam into a second homogenized light beam and a third homogenized light beam;
  receiving the second homogenized light beam in the second leg of the one-piece hollow tubular body;
  reflecting the received second homogenized light beam within the second leg to produce a second leg output light beam having a homogeneous top hat profile and a second intensity equal to one half of the first intensity of the first light beam;
  receiving the third homogenized light beam in the third leg of the body; and
  reflecting the received third homogenized light beam within the third leg to produce a third leg output light beam having a homogeneous top hat profile and a third intensity equal to one half of the first intensity of the first light beam,
  wherein the first light beam is reflected a minimum of five times within the one-piece hollow tubular body.

22. The method of claim 21, wherein the first light beam is reflected a minimum of five times within at least one of the first leg, second leg, and third leg.

* * * * *